United States Patent [19]

Goeldner

[11] Patent Number: 5,325,090

[45] Date of Patent: Jun. 28, 1994

[54] THREE-STAGE, AT LEAST DOUBLED ATM SWITCHING NETWORK

[75] Inventor: Ernst-Heinrich Goeldner, Munich, Fed. Rep. of Germany

[73] Assignee: Siemens Aktiengesellschaft, Munich, Fed. Rep. of Germany

[21] Appl. No.: 844,521

[22] Filed: Mar. 2, 1992

[30] Foreign Application Priority Data

Mar. 14, 1991 [EP] European Pat. Off. ............ 91103976

[51] Int. Cl.⁵ .............................................. H04Q 1/00
[52] U.S. Cl. .................... 340/825.8; 379/271; 370/54
[58] Field of Search ........... 340/825.8, 825.79, 825.03, 340/825.89; 379/270, 271, 272, 273, 279; 370/65, 66, 58.1, 65.5, 16, 54

[56] References Cited

U.S. PATENT DOCUMENTS

| | | | |
|---|---|---|---|
| 3,729,591 | 4/1973 | Gueldenpfennig et al. | 379/270 |
| 4,400,627 | 8/1983 | Zola | 307/115 |
| 4,983,961 | 1/1991 | Brünle et al. | 379/271 |
| 5,103,220 | 4/1992 | Brünle | 370/16 |

FOREIGN PATENT DOCUMENTS

| | | |
|---|---|---|
| 0384936 | 9/1990 | European Pat. Off. |
| 0384961 | 9/1990 | European Pat. Off. |
| 0412343 | 2/1991 | European Pat. Off. |

OTHER PUBLICATIONS

"Performance Analysis of Asymmetric Packet Switch Modules With Channel Grouping", by Soung Liew et al., IEEE Infocom '90, Jun. 3–7, 1990, pp. 668–676.

"ATM ermoglicht unterschiedliche Bitraten im einheitlichen Breitbandnetz", by K. A. Lutz, Siemens AG., Intercom Report 11, (1988) pp. 210–213.

International Switching Symposium 1990, "Innovations In Switching Technology", Stockholm, Sweden, May 28–Jun. 1, 1990, p. 109.

Electronic Letters 26, Aug. 2, 1990, No. 16, Stevenage, Herts, GB, "High Voltage Microwave DC Block For Microstrip Ground Planes", H. Obara et al., p. 1287.

Primary Examiner—Wellington Chin
Assistant Examiner—Shick Hom
Attorney, Agent, or Firm—Hill, Steadman & Simpson

[57] ABSTRACT

Three-stage, at least doubled ATM switching network. A method for expanding a three-stage, stretched and at least doubled ATM self-routing switching network, the switching matrices of the second switching stage can be respectively doubled in one redundancy level after another without interrupting operation given a simultaneous, respective halving of the plurality and filling of link groups formed from the very outset and proceeding between the first switching stage, the second switching stage and the third switching stage, of which link groups only links of one and the same group of links are occupied for every connection lasting during an expansion of the switching network.

5 Claims, 3 Drawing Sheets

THREE-STAGE, AT LEAST DOUBLED ATM SWITCHING NETWORK

BACKGROUND OF THE INVENTION

In recent developments of telecommunications technology, in particular, and in the development of broadband integrated services networks (B-ISDN), the asynchronous transfer mode (ATM) based on asynchronous time-division multiplex technique plays a significant part. The signal transmission is consequently undertaken in a bit stream that is subdivided into cells, each respectively composed of header and useful information parts, of a constant length of, for example, 53 octets that are occupied as needed with packeted messages. Special cells are transmitted when no useful information is to be communicated. Virtual connections, i.e. connections that only in fact use a path section when a message packet (block) is in fact to be communicated via the path section are set up in ATM switching centers, whereby every packet contains, among other things, an address covering, for example, two octets in its header for the unambiguous allocation of the packet to a specific virtual connection. Based on the measure of the respective selection information, every packet at the input to the switching network can thereby contain the complete information for its route through the switching network. Using this information, the switching elements themselves then switch the packet on the defined route (self-routing network) (see, for example, Telcom Report 11 (1988) 6, 210... 213). A two-stage reversing switching network having (32×32) switching matrices can thereby be provided as the switching network, these switching matrices being in turn each respectively capable of being formed of four switching pyramids formed with (16×8) switching elements (see, for example, International Switching Symposium 1900 "Innovations in Switching Technology", Stockholm, Sweden, May 28-Jun. 1, 1990. FIG. 10). For a greater plurality of input ports or output ports to be connected, a stretched three-stage switching network will be provided instead. Since switching equipment must guarantee a practically interruption-free switching operation, at least two redundant switching levels will be provided, i.e. the switching network will be doubled (see, for example, European Patent Application No. 0 384 936).

When establishing switching centers, the case is often is such that, given what is initially a limited number of subscribers, a fully expanded switching network is not initially required. On the contrary, only a partially expanded switching network is adequate, which is capable of being later expanded to form a fully expanded switching network. In order to be able to undertake such an expansion without interrupting operations, a maximally configured, middle switching stage is usually provided from the very outset in a two-stage reversing switching network even when this only has a partial configuration level. For expansion, switching matrices in the first and in the third switching stage are then merely added until the full configuration is achieved and are connected via corresponding links to the switching matrices of the middle switching stage. The switching matrices of the middle switching stage that are already provided in a partial configuration of the switching network, but that are not yet required, then represent an unutilized dedicate resource.

SUMMARY OF THE INVENTION

It is an object of the present invention to provide a three-stage, doubled ATM switching network having full availability that can be expanded without interrupting operations, even without such a advance dedication as discussed above.

The present invention is directed to a stretched three-stage, at least doubled ATM self-routing switching network wherein every switching matrix of the first and third switching stage having a switching matrices given full configuration of the switching network can be connected to p input/output ports and with z links (where $p+z=2n$) and every switching matrix of the middle switching stage can be connected to $2\times 2n$ links, whereby every switching matrix of the middle switching stage having b switching matrices, given full configuration of the switching arrangement, is connected via at least one link to every switching matrix of the first or third switching stage. This switching network is inventively characterized in that, when every switching matrix of the middle switching stage is connected to $2^k$ groups of links (where $k=..., 2, 1, 0$), every switching matrix of the middle switching stage is connected to every switching matrix of every neighboring switching stage via at least respectively one link of each of these $2^k$ groups of links.

Given partial configuration of the switching network, the middle switching stage has only b/t switching matrices (where $t=2^j$ and $j=..., 2, 1$) that are connected to each of a maximum of a/t switching matrices of every neighboring switching stage via respectively t groups of links, whereof, given an expansion of the switching network to b/e switching matrices in the middle switching stage and a maximum of b/e switching matrices in the respectively neighboring switching stage, respectively only e groups of links (where $e=2^i$ and $i=..., 2, 1, 0; i<j$) remain between the previously existing switching matrices. These groups of links being filled up with links connecting the previously existing switching matrices of the middle switching stage to added switching matrices of the first and third switching stage. The remaining $t-e$ groups connect the added switching matrices of the middle switching stage to the previously existing switching matrices of every neighboring switching stage, likewise via respectively e groups of links, whose line locations in the switching matrices connected to one another by them being the same as the line locations of the links not remaining in the expansion between previously existing switching matrices in the switching matrices connected to one another by these in the previous partial configuration. These are filled out in a corresponding manner by links connecting added switching matrices of the middle switching stage to added Switching matrices of the first and third switching stages. Only links of one and the same group of links are occupied in each switching matrix of the middle switching stage, at least for every connection that lasts in an expansion of the switching network.

The present invention has the advantage of not having to fully expand the middle switching stage from the very outset given a partial configuration of the switching network and yet being able to undertake an expansion (by re-equipping both the first and third switching stage as well as the middle switching stage) given unmodified self-routing headers identical for both (redundancy) levels of the doubled switching network without interrupting operations and, thus, without a loss of existing connections. In a further development of the present invention, the one (redundancy) level of the doubled switching network is first placed out of service and is expanded by adding $b/e - b/f$ switching matrices in the middle switching stage and connecting every added switching matrix of the middle switching stage to every switching matrix of the first and third switching stage via respectively at least one link of at least one group of links whose line locations in the switching matrices that they connect to one another are the same as the line locations of the links not remaining between previously existing switching matrices in the expansion in the switching matrices connected to one another by these in the previous partial configuration. After the reinitialization of the one redundancy level, the same procedures are implemented for the other (redundancy) level or levels of the switching network.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
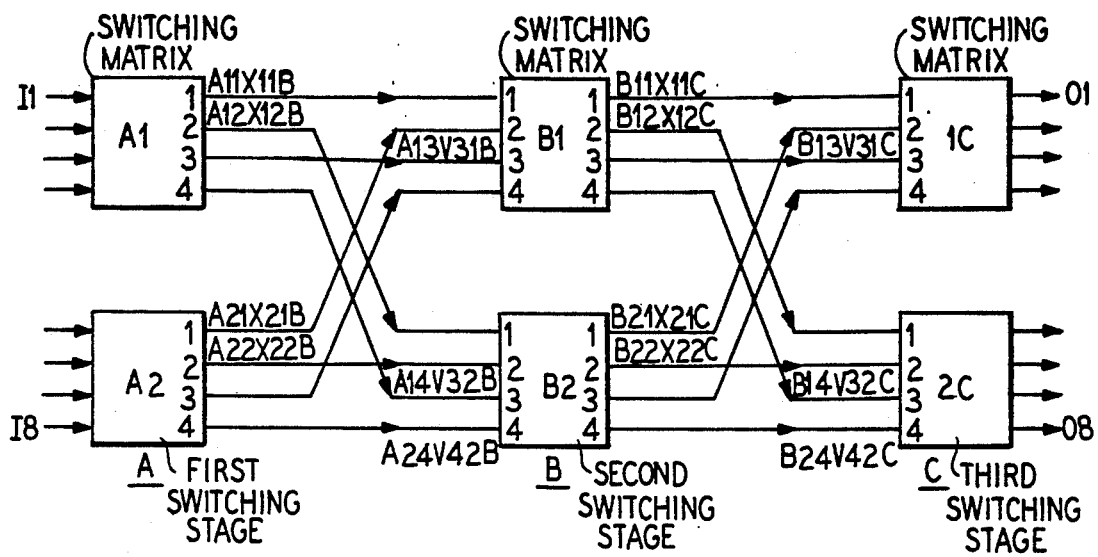
FIG. 1, FIG. 2 and FIG. 3 depict an exemplary embodiment of a stretched three-stage ATM reversing switching network in the condition of a partial configuration (FIG. 1) and after an expansion (FIG. 2 and FIG. 3)

The ATM reversing switching network depicted in FIG. 1 has a first switching stage A equipped in the partial configuration level with $b/t$ switching matrices (where $t=2^j$ and $j=..., 2, 1$), with $b/t=b/2=4$ switching matrices A1, A2, A3, A4 in the example, a middle switching stage B equipped with $b/t$ switching matrices, $b/t=b/2=2$ switching matrices B1, B2 in the example, and a third switching stage C likewise equipped with $b/t=$ two switching matrices 1C, 2C. For the sake of greater clarity, the switching matrices are thereby shown as $(4\times4)$ switching matrices. In practice, for example, $(32\times32)$ switching matrices each having 32 input/outputs can be provided in the middle switching stage B and these can be fashioned as what are referred to an SM32 modules composed of four switching pyramids formed with what are referred to as $(16\times8)$ switching elements, as known, for example, from International Switching Symposium 1900 "Innovations in Switching Technology", Stockholm, Sweden, May 28-Jun. 1, 1990. FIG. 10).

In the outer switching stages A and C, the switching matrices can be connected, on the one hand, to a plurality of links corresponding to the plurality of B switching matrices and, on the other hand, can be connected to a plurality of input ports or, respectively, output ports that is less in comparison thereto and, for example, corresponds to the principles of a Closs switching network. According to FIG. 1, every switching matrix A1, A2 of the A-switching stage A is wired with $p=4$ input ports I1,...,I8 and with $z=4$ links and every switching matrix 1C, 2C of the C-switching stage C is wired with $p=4$ output ports 0.1,...,08 and with $z=4$ links. Every switching matrix B1 and B2 of the B-switching stage B according to FIG. 1 is wired with $2^k$ groups of links (where $k=..., 2, 1, 0$), where $2^k=2^1=2$ groups (X and V) of links (in the example, A11X11B, A21X21B, B11X11C, B12X12C; A13V31B, A23V41B, B13V31C, B14V32C; or A12X12B, A22X22B, B21X21C, B22X22C; A14V32B, A24V42B, B23V41C, B23V42C). Every switching matrix (for example, B1) of the B-switching stage B is thereby connected to every switching matrix (for example, A1 and 2C) of the A-switching stage A and of the C switching stage C via at least respectively one link (in the example, A11X11B and B12X12C as well as A13V31B and B14V32C) of each of $t=2^1=2$ groups (X and V) of links, whereby every switching matrix of the B-switching stage B is connected to every switching matrix of every neighboring switching stage A and C via respectively exactly one link (in the example, A11X11B and B12X12C as well as A13V31B and B14V32C) of every group (X and V) of links in the switching network depicted in FIG. 1. Let it be noted that FIG. 1 shows only one (redundancy) level of a redundant switching network that has two or more such parallel levels, i.e. doubled or multiple levels, whose individual (redundancy) levels can each respectively carry the full traffic and be respectively switched off and on without interrupting operations. Message packets (ATM cells) supplied and proceeding from an offering trunk and to which the full path information was thereby respectively attached preceding the Switching network can (after a corresponding duplication or, respectively, multiplication) thereby be transmitted via the switching network levels parallel to one another to the serving trunk that comes into consideration for the respective virtual connection and, at the latter, can be again restored to form a single ATM cell, as is intrinsically known (from EP-A1-0 384 936) and which therefore need not be set forth in greater detail here. With respect thereto, let it be specifically noted that, in the path finding, only links of one and the same group of links, the links A11X11B and B12X12C (or the links A13V21C and B14V32C) in the example, may potentially be occupied in the respective switching matrix of the B-switching stage B, for example in the switching matrix B1, in the switching network (redundancy) level for every connection of two input or output ports, for example the ports I1 and O8.

An expansion of the switching network depicted in FIG. 1 is required when all input ports I1,...,I8 of the A-switching stage A and output ports 01,...,08 of the C switching stage C are connected and a further system expansion is necessary. The present invention now enables the switching matrices of the B-switching stage B to be multiplied $(2^{j-i})$-fold (where $j=..., 2, 1$ and $i=..., 1, 0$); i.e. a doubling and potentially even a multiple doubling, of the number of switching matrices given a halving, and potentially even a multiple halving of the plurality of link groups and filling of the link groups between A-switching stage, B-switching stage and C switching stage. In accordance there with the A-switching stage and C switching stage can be reequipped to conform to the current requirements.

Figure 2:
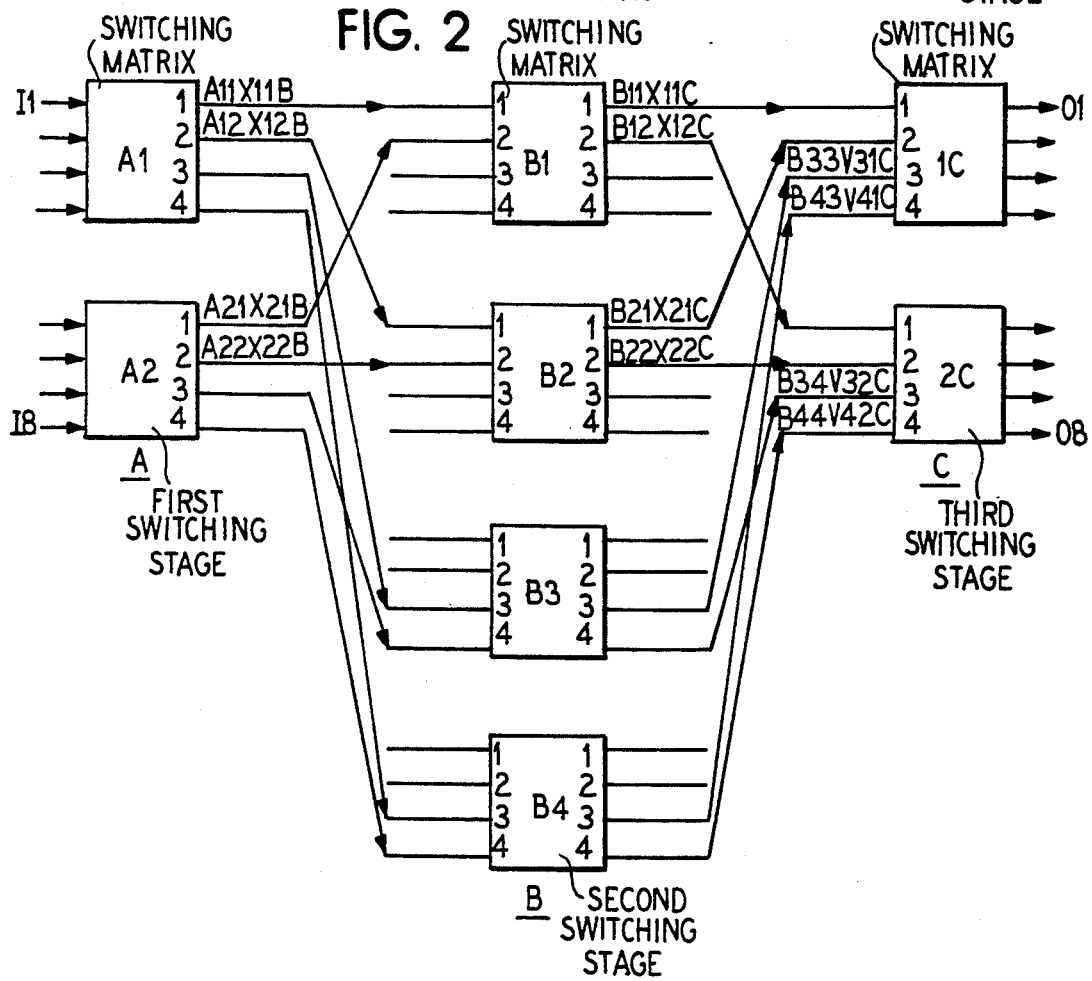
Figure 3:
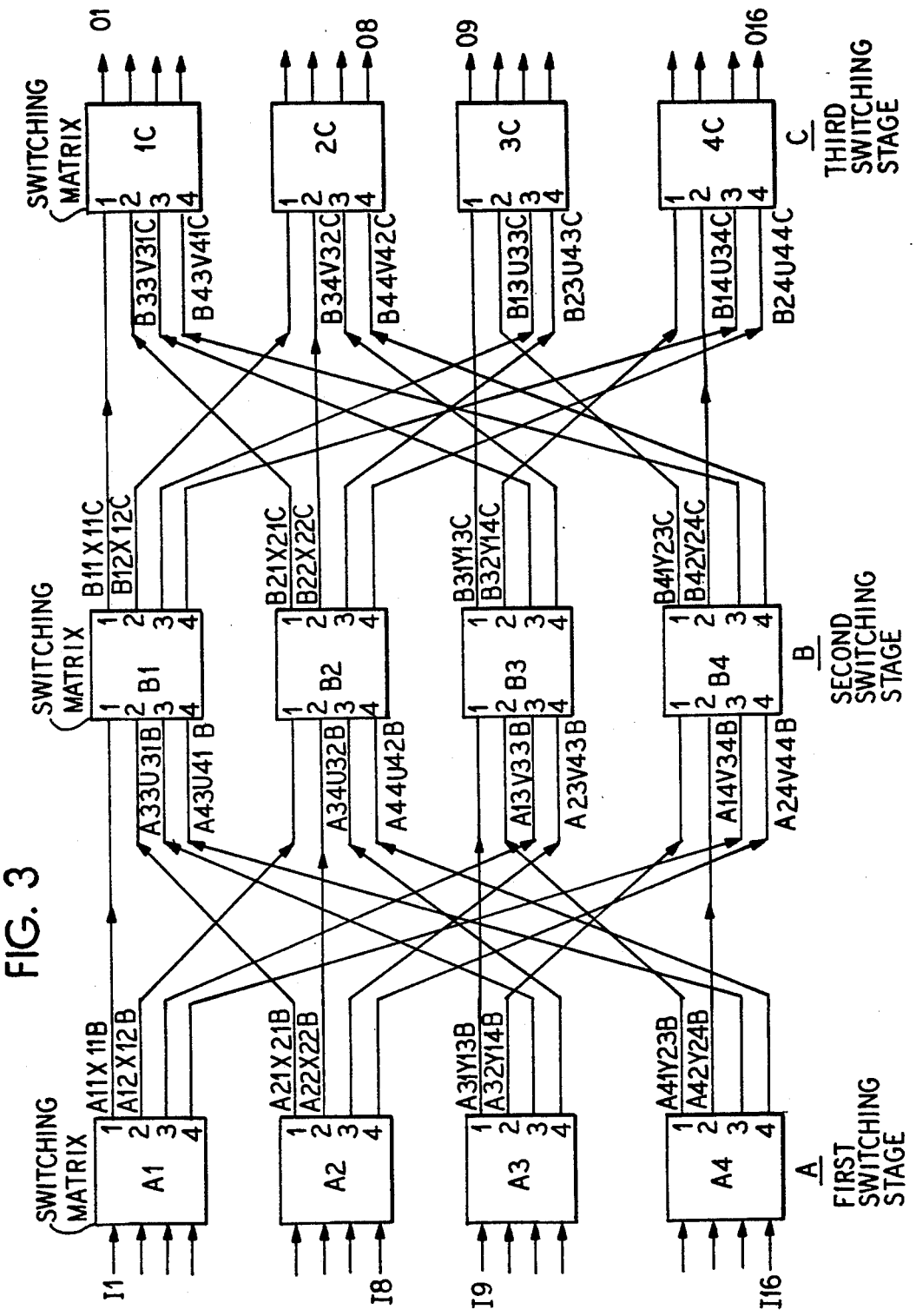

In an expansion of the switching network from, in the example of FIG. 1, eight input ports or, respectively, output ports I1,...,I8 or, respectively, 01,...,08 to, in the example of FIG. 3, a maximum of respectively sixteen ports I1,...,I8, I9,...,I16 and 01,...,08, 09,...,016, a maximum of two further switching matrices A3, A4 or, respectively, 3C, 4C (in FIG. 2) can be added to the initially two switching matrices A1, A2 or, respectively, 1C, 2C (in FIG. 1 and in FIG. 2) of the A or, respectively, C switching stage after corresponding switching matrices B3, B4 (in FIG. 2 and in FIG. 3) had been previously added in the B-switching stage B. When, in the partial configuration of the switching network according to FIG. 1, the b/t=2 switching matrices B1, B2 of the B-switching stage were connected to each of the b/t=2 switching matrices A1, A2 and 1C, 2C of the switching stages A and C via respectively t=2 groups (X, V) of links, and, given an expansion of the switching network to b/e switching matrices in the B-switching stage (where $e=2^i$ and i=..., 2, 1, 0; i<j) and a maximum of b/e switching matrices the A-switching stage and in the C-switching stage, then only e groups of links of these links remain between the previously existing switching matrices. These e groups of links are to be filled up with links that connect the previously existing switching matrices B1, B2 of the B-switching stage to added switching matrices of the A or C switching stage.

In the exemplary embodiment of FIG. 3, e=1 (which means that the switching arrangement has reached its full configuration level) and only one group (X+U) of links A11X11B,...B22X22C remain between the previously existing switching matrices A1, A2; B1, B2; 1C, 2C. This one group is thereby filled up by links A33U31B, A43U41B; B13U33C, B14U34C; or, respectively, A34U32B, A44U42B; B23U43C, B24U44C which connect the previously existing switching matrices B1 and B2 of the B-switching stage to switching matrices A3, A4; 3C, 4C of the neighboring A-switching stages A and C that have been added according to FIG. 3.

Further t−e link groups connect the added switching matrices of the B-switching stage to every switching matrix of every neighboring switching stages A and C, likewise via respectively e groups of links whose line locations in the switching matrices that they connect to one another are thereby identical to the line locations that the links not remaining between previously existing switching matrices in the expansion had in the switching matrices connected to one another by these in the previous partial configuration level. In the exemplary embodiment according to FIG. 2, the links A13V33B, A23V43B, A14V34B, A24V44B and B33V31C, B34V32C, B43V41C, B44V42C connect the added switching matrices B3 and B4 of the B-switching stage to the switching matrices A1, A2 and 1C, 2C of the A or C-switching stage that were already previously present. The line locations in the switching matrices connected to one another by these links, for example the line location 4 in the switching matrix A1 for the link A14V34B and the line location 3 in the switching matrix B4, are the same as the line locations 4 in the switching matrix A1 and 3 in the switching matrix B1 that the corresponding link (in the example, the link A14V32B) had in the switching matrices, the switching matrices A1 and B1 in the example, that were connected to one another by these in the previous partial configuration level. The path information (self-routing header) of the individual cells is thereby respectively the same for the individual links ...V... before and after the expansion.

When, according to FIG. 3, switching matrices A3, A4 or 3C, 4C are added in the A and C-switching stage, the link group (V +Y) containing the links ....V... is to be correspondingly filled up by the links that connect the switching matrices of the B-switching stage added according to FIG. 2 to the switching matrices of the A or C-switching stage added according to FIG. 3. In the exemplary embodiment of FIG. 3, these are the links A31Y13B, A41Y23B, A32Y14B, A42Y24B and B31Y13C, B32Y14C, B41Y23C, B42Y24C.

Given a switching network having a plurality of (redundancy) levels, whereof one is indicated in FIG. 1, FIG. 2 and FIG. 3, an expansion then proceeds in the following manner. Proceeding therefrom that only links of one and the same group (X) of links (A11X11B, B12X12C; A12X12B,...,B22X22C in FIG. 1 and FIG. 2; or A13V31B,... ,A24V42B; B13V31C,... ,B24V42C in FIG. 1 and A13V33B,...,A24V44B; B33V31C,...,B44V42C in FIG. 2) are occupied in the path finding (to be undertaken, moreover, in a known way) in every switching matrix of the B-switching stage, at least for every connection chronologically extending into the expansion phase, i.e. from the very beginning for semi-permanent connections and at least in timely fashion before entering into the expansion phase for the other connections, one (redundancy) level of the switching network is first taken out of service, whereas the other level or levels can continue to operate without interruptions in operations. The additional switching matrices (B3, B4 in FIG. 2) of the B-switching stage B can then be added into the out-of-service (redundancy) level and the link cabling can be reconfigured, as may be fundamentally seen from FIG. 2.

In the example shown here, the links of the group X between the switching matrices A1, A2 of the A-switching stage or 1C, 2C or the C-switching stage and the switching matrices B1, B2 of the B-switching stage are retained, whereas the links of the group V now connect the switching matrices A1, A2 of the A-switching stage or 1C, 2C of the C-switching stage to the added switching matrices B3, B4 of the B-switching stage. The line locations in the switching matrices connected to one another by these links, for example, for the link B43V41C the line location 3 in the switching matrix B4 and the line location 4 in the switching matrix 1C are identical to the line locations 3 in the switching matrix B2 and 4 in the switching matrix 1C that the corresponding link (the link B23V41C in the example) had in the switching matrices, the switching matrices B2 and 1C in the example, connected to one another by this link in the previous partial configuration level. Subsequently (and potentially after an offline test is implemented), the expanded (redundancy) level of the switching network can be placed back into service and the same procedure can be implemented for the second redundancy level (and, subsequently, for every other potentially further redundancy level).

Since the routing information for the individual useful connections do not change with the new configuration, partially configured and expanded configuration level are the same for all switching matrices (A1, A2; 1C, 2C) of the A or C-switching stage that were already present before the expansion as seen from the point of view of the controller of the exchange side and connections can be set up and cleared down during the expansion phase as well.

Figure 4:
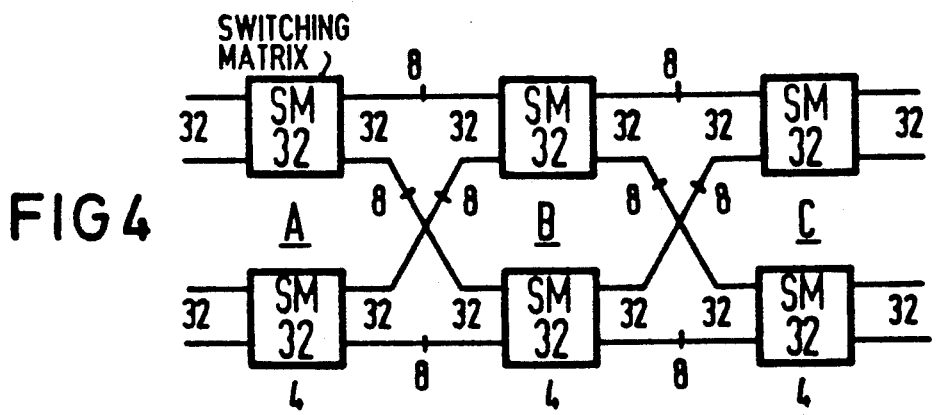
FIG. 4, FIG. 5, FIG. 6 and FIG. 7 show further switching networks of this type in different levels of configuration.
Figure 5:
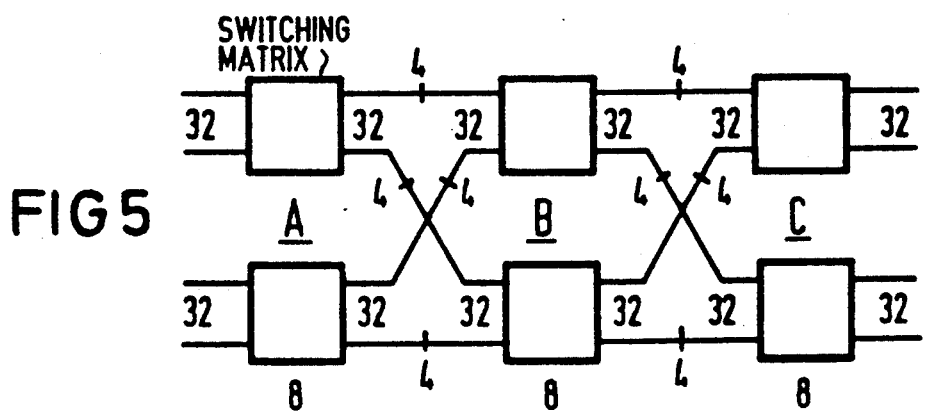
Figure 6:
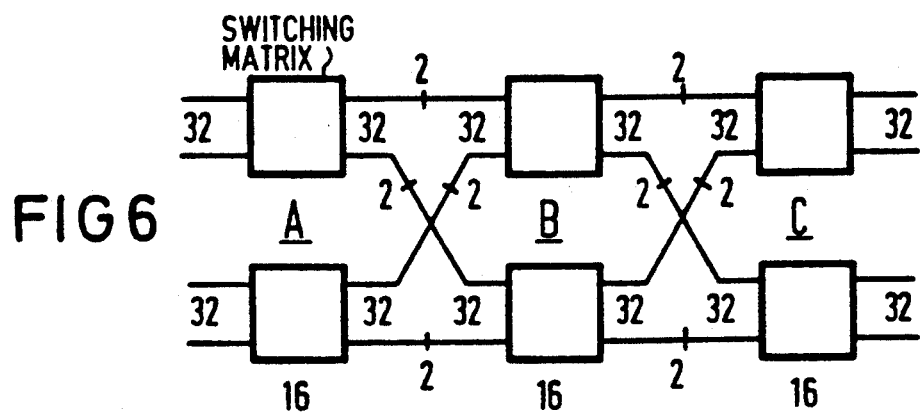
Figure 7:
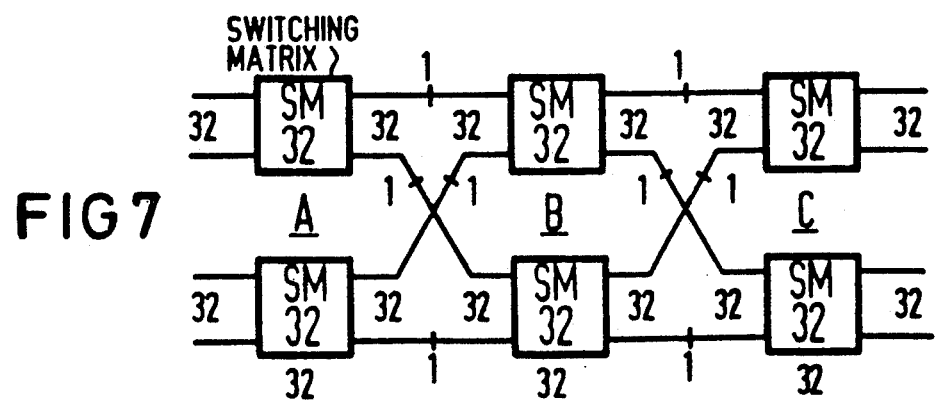

Let the following also be noted in conclusion. The present invention has been set forth above on the basis of FIG. 1 through FIG. 3 with reference to the example of an expansion of the switching network to twice its size, the full configuration level of the switching network having been simultaneously reached therewith in the exemplary embodiment. In a corresponding manner, a switching network, however, can also be expanded from a lower partial configuration level into, initially, a higher partial configuration level, as is the case, for example, given an expansion of the switching network depicted in FIG. 4 having a maximum of 128 input ports and 128 output ports to form a switching network depicted in FIG. 5 having a maximum of 256 input ports and 256 output ports. Furthermore, the switching network can also be expanded by more than one power of 2, as is the case given an expansion to form the switching network depicted in FIG. 6 having a maximum of 512 input ports and 512 output ports or the switching network depicted in FIG. 7 having a maximum of 1024 input ports and 1024 output ports. The number of link groups proceeding between the individual switching stages A, B, C is thereby diminished with a corresponding plurality of powers of 2, see FIGS. 4–7.

The invention is not limited to the particular details of the apparatus and method depicted and other modifications and applications are contemplated. Certain other changes may be made in the above described apparatus and method without departing from the true spirit and scope of the invention herein involved. It is intended, therefore, that the subject matter in the above depiction shall be interpreted as illustrative and not in a limiting sense.

What is claimed is:

1. A three-stage, at least doubled ATM self-routing switching network, having switching matrices, every switching matrix of a first switching stage and of a third switching stage, each of the first and third switching stages respectively having a switching matrices given full configuration of the switching network, connectable to input ports or output ports and to links and every switching matrix of a middle switching stage connectable to the links, every switching matrix of the middle switching stage having b switching matrices, given full configuration of the switching network, being connected to every switching matrix of the first or third switching stage, via at least one link, comprising: given connection of each switching matrix of the middle switching stage to $2^k$ groups of links where k is a whole number and where k =..., 2, 1, 0, every switching matrix of the middle switching stage is connected to every switching matrix of every neighboring switching stage via at least one respective link of each of the $2^k$ groups of links; given partial configuration of the switching network, the second switching stage having only b/t switching matrices, where $t=2^j$ and j =..., 2, 1 where j is a whole number, that are connected to each of a maximum of b/t switching matrices of every neighboring switching stage via respectively t groups of links whereof, given an expansion of the switching network to b/e switching matrices in the middle switching stage and a maximum of b/e switching matrices in the respectively neighboring switching stage, only respectively e groups of links, where $e=2^i$ and i =..., 2, 1, 0 where i is a whole number; i<j, remain between previously existing switching matrices from the partial configuration that are filled out by links connecting the previously existing switching matrices of the second switching stage to added switching of the first or third switching stage, and further t−e groups of links connect added switching matrices of the middle switching stage to the previously existing switching matrices of every neighboring switching stage, via respectively e groups of links whose line locations in the switching matrices that the further t−e groups connect to one another are identical to the line locations that original links, that do not remain between previously existing switching matrices, had in the switching matrices connected to one another by the original links in the previous partial configuration and that are correspondingly filled up by links connecting the added switching matrices of the second switching stage to added switching matrices of the first and third switching stages; and only links of one and the same group of links being occupied in every switching matrix of the middle switching stage for every connection lasting during an expansion of the switching network.

2. The three-stage, at least doubled ATM self-routing switching network according to claim 1, wherein only respective links of one and the same group of links are occupied in every switching matrix of the middle switching stage for individual connections.

3. A method for expanding a three-stage, at least doubled ATM switching network having switching matrices, wherein every switching matrix of a first switching stage and a third switching stage each respectively having a switching matrices given full configuration of the switching network, is connectable to input ports or output ports and to links and every wherein every switching matrix of the middle switching stage is connectable to the links, whereby every switching matrix of the middle switching stage having b switching matrices, given full configuration of the switching network, is connected to every switching matrix of the first or third switching stage, via at least one link, comprising the steps of:

(a) when wiring each switching matrix of the middle switching stage to $2^k$ groups of links, where k is a whole number and where k =..., 2, 1, 0, connecting every switching matrix of the middle switching stage to every switching matrix of every neighboring switching stage via at least respectively one link of each of the $2^k$ groups of links;

(b) given partial configuration of the switching network, providing the second switching stage having only b/t switching matrices, where $t=2^j$ and j =..., 2, 1 where j is a whole number, that are connected to each of a maximum of b/t switching matrices of every neighboring switching stage via respectively t groups of links whereof, given an expansion of the switching network to b/e switching matrices in the middle switching stage and a maximum of b/e switching matrices in the respectively neighboring switching stage, leaving only respectively e groups of links, where $e=2^i$ and i =..., 2, 1, 0 where i is a whole number; i<j, between previously existing switching matrices from the partial configurations that are filled out by links connecting the previously existing switching matrices of the second switching stage to added switching matrices of the first or third switching stage, and providing further t−e groups of lines that connect the added switching matrices of the middle switching stage to the previously existing switching matrices of every neighboring switching stage via respectively e groups of links whose lines locations in the switching matrices that the further t−e groups connect to one another are identical to the line locations that original links, that do not remain between previously existing switching matrices, had in the switching matrices connected to one another by the original links in the previous partial configuration and that are correspondingly filled up by links connecting the added switching matrices of the second switching stage to added switching matrices of the first and third switching stages, wherein only links of one and the same group of links are occupied in every switching matrix of the middle switching stage for every connection lasting during an expansion of the switching network;

(c) taking out of service one redundancy level of a doubled switching network;

(d) expanding the one level by adding $b/e-b/t$ switching matrices in the middle switching stage and connecting every added switching matrix of the middle switching stage to every switching matrix of the first or third switching stage via at least respectively one link of at least one group of links, whose line locations in the switching matrices that they connect to one another are the same as the line location of the links not remaining between previously existing switching matrices, in the expansion in the switching matrices connected to one another by the original links in the previous partial configuration level; and (e) after a return of said one redundancy level into service, going to step (c) for the other redundancy level or levels of the switching network.

4. A method for expanding a three-stage, at least doubled ATM self-routing switching network having switching matrices, wherein every switching matrix of a first switching stage and a third switching stage each respectively having a switching matrices, given full configuration of the switching network, is connectable to input ports or output ports and to links and wherein every switching matrix of the middle switching stage is connectable to the links, whereby every switching matrix of the middle switching stage having b switching matrices, given full configuration of the switching network, is connected to every switching matrix of the first or third switching stage, via at least one link, comprising the steps of:

(a) when wiring each switching matrix of the middle switching stage to $2^k$ groups of links, where k is a whole number and where $k=..., 2, 1, 0$, connecting every switching matrix of the middle switching stage to every switching matrix of every neighboring switching stage via at least respectively one link of each of the $2^k$ groups of links;

(b) given partial configuration of the switching network, providing the second switching stage having only b/t switching matrices, where $t=2^j$ and $j=..., 2, 1$ where j is a whole number, that are connected to each of a maximum of b/t switching matrices of every neighboring switching stage via respectively t groups of links whereof, given an expansion of the switching network to b/e switching matrices in the middle switching stage and a maximum of b/e switching matrices in the respectively neighboring switching stage, leaving only respectively e groups of links, where $e=2^i$ and $i=..., 2, 1, 0$ where i is a whole number; $i<j$, between previously existing switching matrices from the partial configurations that are filled out by links connecting the previously existing switching matrices of the second switching stage to added switching matrices of the first or third switching stage, and providing further $t-e$ groups of lines that connect the added switching matrices of the middle switching stage to the previously existing switching matrices of every neighboring switching stage via respectively e groups of links whose line locations in the switching matrices that the further $t-e$ groups connect to one another are identical to the line locations that original links, that do not remain between previously existing switching matrices, had in the switching matrices connected to one another by the original links in the previous partial configuration and that are correspondingly filled up by links connecting the added switching matrices of the second switching stage to added switching matrices of the first and third switching stages, wherein only links of one and the same group of links are occupied in every switching matrix of the middle switching stage for every connection lasting during an expansion of the switching network.

5. The method for expanding a three-stage, at least doubled ATM switching network according to claim 4, wherein the method further comprises the steps of:

(c) taking out of service one redundancy level of a doubled switching network; and (d) adding $b/e-b/t$ switching matrices in the middle switching stage and connecting every added switching matrix of the middle switching stage to every switching matrix of the first or third switching stage via at least respectively one link of at least one group of links, whose line locations in the switching matrices that they connect to one another are the same as the line locations of the links not remaining between previously existing switching matrices in the expansion in the switching matrices connected to one another by the original links in the previous partial configuration level; and (e) after a return of said one redundancy level into service, going to (c) for the other redundancy level or levels of the switching network.

* * * * *